Patented Nov. 4, 1947

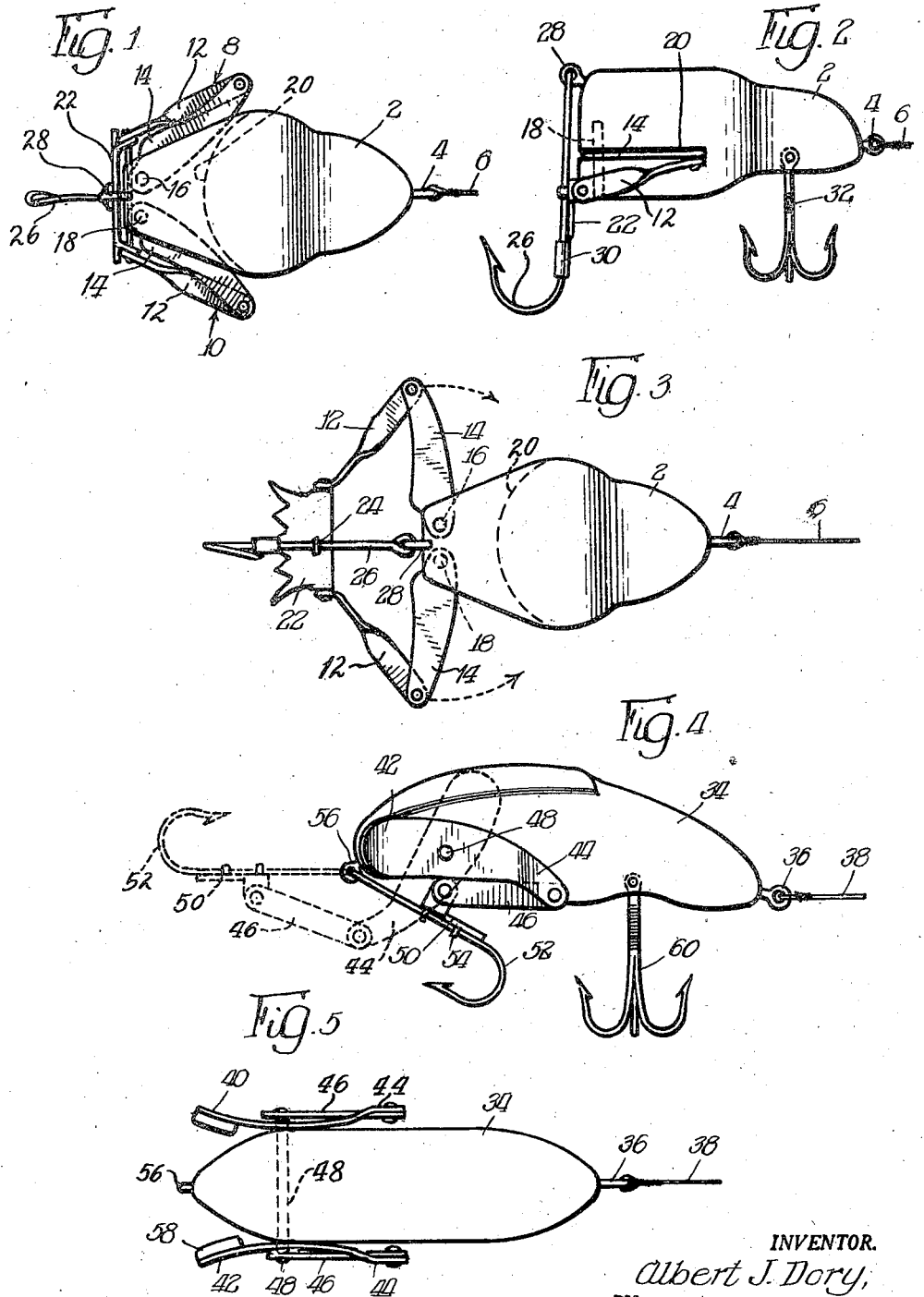

2,430,111

UNITED STATES PATENT OFFICE 2,430,111

ARTIFICIAL FISHING LURE

Albert J. Dory, Chicago, Ill.

Original application April 30, 1942, Serial No. 441,071. Divided and this application October 25, 1943, Serial No. 507,506

5 Claims. (Cl. 43—42)

The present invention relates to fishing tackle and more in particular to novel improvements in artificial lures, the present application being a division of application Serial No. 441,071, filed April 30, 1942, now Patent No. 2,365,628, issued December 19, 1944, for Artificial fishing lure.

Among the objects of the present invention is to provide an artificial lure of simplified construction, which closely simulates natural food for fish, and wherein the said lure is formed with articulated body members which have movement closely approaching the movement of similar members of the said natural food for fish.

Another object of the present invention is to provide a novel improvement in artificial fishing lures, which are of simplified construction involving the use of a minimum amount of strategic materials, and which can be made of plastics, wood and other similar material, properly colored to simulate any particular natural bait desired.

As a further object, the present invention comprehends a novel artificial lure in which certain articulated elements or members are moved in a predetermined manner to simulate the natural bait when the same is moved forwardly in water.

Still another object of the present invention is to provide a novel artificial lure having articulated body elements to which means is connected for moving said body elements by water pressure.

As a still further object, the present invention contemplates an artificial lure in which the articulated body elements are moved by means of water pressure acting against the same as the lure is moved forwardly and in which the said articulated body elements are connected to the body in such a way as to have lateral swinging motion in respect thereto.

Another object within the purview of the present invention is to provide a novel artificial lure having articulated body elements, the movement of which is initiated through the medium of water, and in which means is provided to return the said articulated body elements from their normal extended position to their normal unextended position adjacent the body, whereby the device may by proper manipulation simulate a cyclic series of movements of natural bait.

Other objects, features, capabilities and advantages are comprehended by the invention, as will later appear and as are inherently possessed thereby.

Referring to the drawings—

Figure 1 is a top plan view of an artificial fishing lure made in accordance with the present invention;

Figure 2 is a view in side elevation of the lure shown in Figure 1 of the drawings;

Figure 3 is a top plan view of the fishing lure shown in Figure 1 of the drawings, but with the articulated body elements in their extended position;

Figure 4 is a view in side elevation of another form of construction for an artificial fishing lure made in accordance with the present invention; and Figure 5 is a top plan view of the lure shown in Figure 4 of the drawings.

Referring now more in detail to the drawings, an embodiment selected to illustrate the present invention is shown in Figures 1, 2 and 3 as comprising a body 2 having means 4 at its forward end for connection to a line 6, and having at its rear articulated body members 8 and 10 which comprise elements 12 and 14, the latter elements having their ends pivoted to the body 2 as at 16 and 18, and being operable in a horizontal slot 20, and the former being pivotally connected to the cross member 22. The member 22 has its marginal edge serrated to simulate the feet of a frog, and is connected as at 24 to a hook 26 swivelly and pivotally connected, through the eye 28, to the body 2 above the slot 20. The barbed end of the hook, as clearly shown in Figure 2, extends beyond the cross member 22 and may be weighted as at 30. The treble hook 32 may be connected to the body 2 in spaced relation to the hook 26, if desired.

As clearly shown in Figures 1 and 2, the arrangement of the elements 12 and 14 of the body members 8 and 10 is such that members 14 in unextended position are disposed substantially within the slot 20 and extend laterally of the body portion and are connected through the elements 12 to the cross piece 22 disposed substantially vertical adjacent the rear end of the body 2. However, upon application of water pressure to the member 22, as would be experienced upon application of force to the line 6, the articulated body elements assume the position as shown in Figure 3 of the drawings, whereby the hook and the body elements are disposed to the rear of the body 2 in substantially horizontal position. At this time the entire articulated assembly as a unit may swing laterally of the body 2 about the pivot points 16 and 18, all as indicated by arrows in Figure 3. This feature lends lifelike action to the artificial lure during its operation in water. Upon release of pressure on the line 6, the articulated body elements tend to move into the position as shown in Figures 1 and 2, and in order to assist such movement, weight 30 is connected to the hook, as disclosed.

The form of the invention shown in Figures 4 and 5 as an alternative construction, conforms in a good many respects to the embodiment shown in Figures 1, 2 and 3, and comprises a body 34 having means 36 adjacent its forward end, to which a line 38 may be attached. The articulated body members in this modification, as represented by the reference numerals 40 and 42, include elements 44 and 46, the former of which are pivoted to the body 34 intermediate their ends as at 48, and the latter of which are pivotally connected together by the cross member 50, which conforms substantially to the cross member 22, and has its edge serrated to simulate the feet of a natural frog. As in the embodiment shown in Figures 1, 2 and 3, a hook element 52 is connected to the cross member 50 as at 54, and has its opposite end hingedly and swingably connected through the eye 56 to the rear end of the body 34. The hook 52 has its barbed end extending beyond the cross member 50 so as to be in position as shown in full line in Figure 4 when the articulated body members 40 and 42 are in their forwardly unextended position with respect to the body 34. However, the cross member 50 is disposed beneath the body 34 and in a position whereby water pressure applied thereto, upon the application of force to line 38, causes the articulated members 40 and 42 to assume the position as shown in dotted lines in Figure 4 of the drawings, wherein the said member 50 is in substantially a horizontal position.

In this respect the movement of the articulated body members 40 and 42 is somewhat generally the same as in the embodiment of Figures 1, 2 and 3. However, in this modification the articulated elements 44 are pivoted for movement in substantially a vertical plane, and the ends thereof are weighted as at 58 to assist in returning the articulated body elements to their forward unextended position in respect to the body 34 from their normal extended position when the pressure on line 38 is momentarily released. This causes movement of the articulated members to simulate the action of corresponding elements of a natural frog. In this embodiment, however, the arrangement between the articulated elements 40 and 42 and the body 34 is not such as to give the horizontal pivotal action present in the embodiment according to Figures 1, 2 and 3. As in the embodiment shown in Figures 1, 2 and 3, the treble hook 60 may be connected to the body 34 in spaced relation to the hook 52, if desired.

In the use of these various embodiments, according to the invention, the same may be cast as any other artificial lure or plug, and retrieved, it being desirable in the retrieving action to make use of the structure involved to give a simulated natural action to the bait, the said action in the present instances consisting of the movement of the body elements to correspond to like elements of a natural frog. While the lures as shown are representative of the under-water type which operate slightly below the surface, nevertheless, the present invention contemplates that the lures may be properly balanced and weighted to give the desired action either under or adjacent the surface or at a substantial distance below such surface.

While I have herein described and upon the drawings shown illustrative embodiments of the invention, it is to be understood that the invention is not limited thereto but may comprehend other constructions, arrangements of parts, details and features without departing from the spirit of the invention.

What is claimed is:

1. An artificial fishing lure, comprising a body having a size and shape to simulate some natural food for fish, articulated body elements hingedly connected to said body, means articulatedly connecting together certain of said body elements at the ends thereof opposite the said hinge connections, said means including a fluid responsive member for moving said articulated body elements from an unextended position to an extended position whereby to simulate life-like action upon forward movement of the body in said fluid medium, and other means having securement at one end to said fluid responsive member and being pivotally connected at its other end to the rear of said body.

2. An artificial fishing lure, comprising a body having a size and shape to simulate some natural food for fish, articulated body elements hingedly connected to said body, means articulatedly connecting together certain of said body elements at the ends thereof opposite the said hinge connections, said means including a fluid responsive member for moving said articulated body elements from an unextended position to an extended position whereby to simulate life-like action upon forward movement of the body in said fluid medium, and a hook member having securement intermediate its length to said fluid responsive member and being pivotally connected at one end to the rear of the body between said hinge connections.

3. An artificial fishing lure comprising a body having a size and shape to simulate some natural food for fish, a pair of articulated body elements hingedly connected at one end to the body respectively, means articulatedly joining the body elements at the ends opposite said hinge connections including a fluid responsive member for moving said elements from an unextended position to an extended position whereby to simulate life-like action upon forward movement of the body in said fluid medium, and a hook member having securement intermediate its length to said fluid responsive member and being pivotally connected at the end opposite the hook to the rear of the body between said hinge connections, said hook member assisting in returning the articulated body elements to an unextended position.

4. An artificial fishing lure, comprising a body having a size and shape to simulate some natural food for fish, articulated body elements hingedly connected to said body, means articulatedly connecting together certain of said body elements at the ends thereof opposite the said hinge connections, said means including a fluid responsive member for moving said articulated body elements from an unextended position to an extended position whereby to simulate life-like action upon forward movement of the body in said fluid medium, said hinge connections being constructed and arranged to allow lateral movement of the articulated body elements to and from an extended position, and other means having securement intermediate its length to said fluid responsive member and being pivotally connected at one end to the rear of the body member, said other means assisting in returning the articulated body elements to unextended position.

5. An artificial fishing lure comprising a body having a size and shape to simulate some natural food for fish, articulated body elements on the respective sides of the body, one of said elements on each side of the body being pivoted thereto intermediate its length for movement in a substantially vertical plane, means articulatedly joining certain of said body elements including a fluid responsive member for moving said elements from an unextended position to an extended position whereby to simulate life-like action upon forward movement of the body in said fluid medium, and weights fixed to the outer free end of each pivoted body element to thereby assist in returning the articulated body elements from their extended to their unextended position.

ALBERT J. DORY.

REFERENCES CITED

The following references are of record in the file of this patent:

UNITED STATES PATENTS

| Number | Name | Date |
| --- | --- | --- |
| 2,217,677 | George | Oct. 15, 1940 |
| 1,874,102 | Jacobs | Aug. 30, 1932 |